R. & T. ROSS.
Chuck.
No. 57,383.
Patented Aug. 21, 1866.
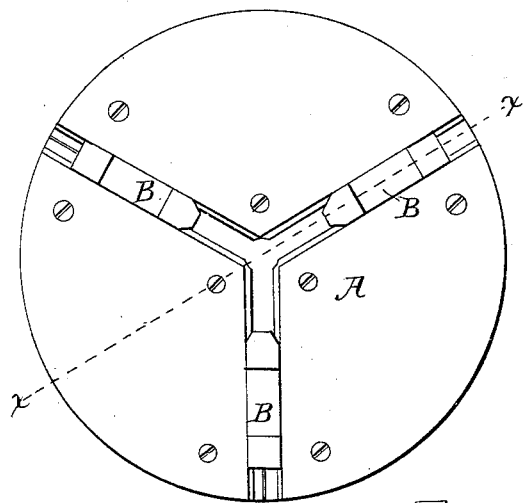
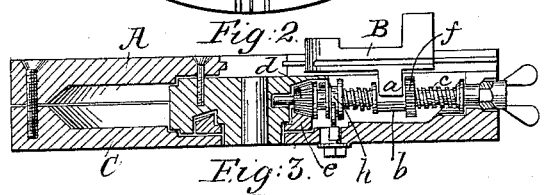
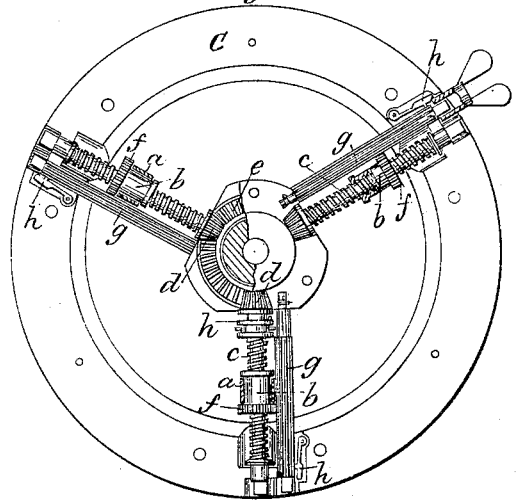
Witnesses
Inventors

UNITED STATES PATENT OFFICE.

ROBERT ROSS AND THOMAS ROSS, OF MIDDLEBURY, VERMONT.

IMPROVEMENT IN CHUCKS.

Specification forming part of Letters Patent No. 57,383, dated August 21, 1866.

*To all whom it may concern:*

Be it known that we, ROBERT ROSS and THOMAS ROSS, of Middlebury, in the county of Addison and State of Vermont, have invented a new and Improved Compound Universal Chuck; and we do hereby declare that the following is a full, clear, and exact description thereof, which will enable others skilled in the art to make and use the same, reference being had to the accompanying drawings, forming part of this specification, in which—

Figure 1 represents a face view of this invention. Fig. 2 is a transverse section of the same, the line $xx$, Fig. 1, indicating the plane of section. Fig. 3 is an elevation of the internal mechanism or gear which serves to operate the jaws of our chuck.

Similar letters of reference indicate like parts.

This invention relates to a chuck the jaws of which are combined with suitable gearing in such a manner that the same can either be moved simultaneously or each independent of the other, and that the same can be used for clamping pieces of metal, wood, or other material concentrically or eccentrically, as may be desirable.

The internal gearing or mechanism consists of three or more radiating screws, which are geared together by a circular rack placed in the hub or near to the center of the chuck. On each screw is fitted a nut made in the form of a spur-pinion, and provided with collars to lock into or embrace a forked projection secured in the inner surfaces of the jaws, in such a manner that by turning one of the screws all the nuts are caused to travel simultaneously toward and from the center and the jaws open and close together.

The spur-pinions of the nuts mesh into teeth of long pinions, which extend parallel with the radiating screws. By turning one of these long pinions the appropriate jaw is made to travel toward or from the center of the chuck independent of the remaining jaws, and by turning these long pinions the several jaws can be adjusted to clamp an article eccentrically.

A represents the face-plate of our chuck, which is grooved to receive the jaws B. Said face-plate is secured to the bed-plate C of the chuck by screws or any other suitable means, and in the inner surfaces of the jaws are secured the forked projections $a$, which straddle the nuts $b$. Said nuts are tapped to fit on screws $c$, which radiate from the center of the bed-plate, and they are provided with collars to embrace the projections $a$, as shown in Figs. 2 and 3 of the drawings.

On the inner ends of the screws are mounted the bevel-pinions $d$, which gear in the circular rack $e$. This circular rack is fitted in the hub of the bed-plate of the chuck so that it rotates freely, and that by turning one of the screws a rotary motion is imparted to the several other screws, and the nuts, together with the jaws, are moved simultaneously toward and from the center.

The nuts $b$ are provided with cogs $f$, which gear in long pinions $g$, secured in the hub and bed-plate of the chuck, parallel with the screws $c$. To prevent these long pinions from turning when the wrench is applied to the screws (which they might be caused to do by the friction of the screw in the nut) there is a catch or pawl, $h$, which springs into a tooth on the pinions. These catches or pawls are so situated that when the wrench is applied to the long pinions it forces the appropriate catch out of the teeth, its end being beveled off for that purpose, when the pinion may be freely turned in either direction. By turning one of the long pinions the appropriate jaw is moved in or out independent of the others, and after the jaws have been adjusted eccentrically to correspond to an eccentric or curved piece of work, they can be moved toward or from the center simultaneously, so that they clamp or release the piece of work, as may be desired.

Instead of adjusting the nuts $b$ and jaws B by means of the long pinions $g$, the bevel-pinions $d$ on the inner ends of the screws may be attached to the same by means of adjustable clutches $h$, (see Fig. 3,) so that each pinion can be thrown in and out of gear, and each screw can be made to move independent of the other; or two or more of the screws can be geared together and made to move simultaneously. This arrangement, though not so good as that previously described, produces the same effect, and we consider it a mechanical equivalent.

What we claim as new, and desire to secure by Letters Patent, is—

The long pinions $g$, or their equivalents, in combination with the nuts $b$, screws $c$, and jaws B of a chuck, constructed and operating substantially as and for the purpose described.

ROBERT ROSS.
THOS. ROSS.

Witnesses:
HENRY S. FOOTE,
HENRY E. HUNT.